US008199341B2

(12) United States Patent
Hikosaka

(10) Patent No.: US 8,199,341 B2
(45) Date of Patent: Jun. 12, 2012

(54) IMAGE PROCESSING APPARATUS, IMAGE FORMING APPARATUS, AND COMPUTER-READABLE RECORDING MEDIUM STORING IMAGE PROCESSING PROGRAM FOR CREATING A COPY PREVENTION PATTERN THAT ALLOWS A COPYING MACHINE WITH A COPY GUARD FUNCTION TO READ A SPECIAL DOT PATTERN

(75) Inventor: Ariyoshi Hikosaka, Osaka (JP)

(73) Assignee: Kyocera Mita Corporation (JP)

( * ) Notice: Subject to any disclaimer, the term of this patent is extended or adjusted under 35 U.S.C. 154(b) by 889 days.

(21) Appl. No.: 12/254,878

(22) Filed: Oct. 21, 2008

(65) Prior Publication Data

US 2009/0109492 A1 Apr. 30, 2009

(30) Foreign Application Priority Data

Oct. 31, 2007 (JP) .................................. 2007-282791

(51) Int. Cl.
*G06K 15/00* (2006.01)
(52) U.S. Cl. ..................... 358/1.14; 358/1.15; 358/1.13; 358/453; 358/462; 358/3.28; 382/282; 382/284; 399/366
(58) Field of Classification Search .................. 358/1.14, 358/3.28, 448, 538, 453, 462, 1.9; 382/100, 382/232, 282, 284; 399/15, 366
See application file for complete search history.

(56) References Cited

U.S. PATENT DOCUMENTS

| 5,430,525 | A | * | 7/1995 | Ohta et al. | 399/366 |
| 5,596,594 | A | * | 1/1997 | Egawa | 372/93 |
| 5,610,688 | A | * | 3/1997 | Inamoto et al. | 399/366 |
| 5,841,377 | A | * | 11/1998 | Takamizawa et al. | 341/51 |
| 6,473,194 | B1 | * | 10/2002 | Sakai | 358/1.17 |
| 6,490,681 | B1 | * | 12/2002 | Kobayashi et al. | 713/171 |
| 7,536,026 | B2 | * | 5/2009 | Kaneda et al. | 382/100 |
| 7,599,081 | B2 | * | 10/2009 | Shimura et al. | 358/1.14 |
| 7,701,598 | B2 | * | 4/2010 | Tanaka | 358/1.14 |
| 7,742,196 | B2 | * | 6/2010 | Uchida et al. | 358/3.28 |
| 7,800,906 | B2 | * | 9/2010 | Chang | 361/700 |
| 2002/0196465 | A1 | * | 12/2002 | Ohta | 358/1.16 |
| 2005/0041263 | A1 | * | 2/2005 | Ishikawa et al. | 358/1.14 |
| 2005/0174596 | A1 | | 8/2005 | Uchida et al. | |
| 2006/0067759 | A1 | * | 3/2006 | Osaka | 399/366 |
| 2006/0222380 | A1 | | 10/2006 | Shimazawa et al. | |

FOREIGN PATENT DOCUMENTS

JP 2005235181 9/2005
JP 200610721 1/2006

* cited by examiner

*Primary Examiner* — Twyler Haskins
*Assistant Examiner* — Dennis Dicker
(74) *Attorney, Agent, or Firm* — Gerald E. Hespos; Michael J. Porco

(57) ABSTRACT

An image area detecting portion detects an area (image area) in a sheet subjected to printing where characters and images take up. A pattern creating portion creates a copy prevention pattern in such a manner that a latent image is embedded only to a detected image area with respect to a mask pattern into which a dot pattern is incorporated. A print image creating portion superimposes the generated copy prevention pattern and the document image to each other. When the printed object is read in a copying machine having a copy guard function, detection of the dot pattern can be performed without being interfered by a latent image since only a mask pattern is printed in an area corresponding to a reading start position.

9 Claims, 7 Drawing Sheets

IMAGE PROCESSING APPARATUS, IMAGE FORMING APPARATUS, AND COMPUTER-READABLE RECORDING MEDIUM STORING IMAGE PROCESSING PROGRAM FOR CREATING A COPY PREVENTION PATTERN THAT ALLOWS A COPYING MACHINE WITH A COPY GUARD FUNCTION TO READ A SPECIAL DOT PATTERN

BACKGROUND OF THE INVENTION

1. Field of the Invention

The present invention relates to a technology of creating a print image by creating a copy prevention pattern, a latent image, which comes up at a time of copying is embedded, into a mask pattern, into which a special dot pattern for preventing copying is incorporated, and superimposing the copy prevention pattern onto a document image.

2. Description of the Related Art

As a method for preventing copying of a confidential document and the like, there has been known a method of using a pattern image which causes warning characters to appear if copying of the confidential document is performed in a copying machine (Japanese Patent Unexamined Publication No. 2005-235181). Creating a document with use of such pattern image has an effect of psychologically preventing unfair copying and distinguishing an original document from a copy.

However, even though the method using the pattern image has an effect of psychologically preventing the unfair copying, it cannot physically prevent the copying, and leaking of information cannot be prevented completely. Therefore, there has been a known copying machine having a copy guard function for preventing leaking of information of a document. According to the copy guard function, a mask pattern, into which a special dot pattern is incorporated, is printed together with a document image, and when the document is to be copied, the copying machine identifies the dot pattern to prohibit copying of the document or forms a solid image without printing the document image. This copy guard function is realized only with a copying machine which stores the special dot pattern and has a function of detecting the special dot pattern from image data obtained by reading of the document. In other words, if copying of a document, on which a mask pattern having the special dot pattern is printed, is performed with a copying machine which does not have the copy guard function, the mask pattern is read as a mere image, and copying can be performed as usual.

Therefore, as shown in FIG. 7, there is a case where a method combining the mask pattern and the latent image is used. In particular, a document 91, in which a latent image is embedded into the mask pattern, is created. When the copying machine 92 does not have the copy guard function, and the document 91 is copied, a document image is printed so that characters of "copy prohibited" come up together like the copy 93. On the other hand, when the copying machine 92 has the copy guard function, printing the document image is not performed, and alternatively, for example, a solid image like the copy 94 is printed.

The mask pattern into which the latent image is embedded will be described as "copy prevention pattern" hereinafter. In the copy prevention pattern before being copied, difference in densities of the mask pattern and the latent image is so small that the copy prevention pattern is identified as normal pattern when viewed with naked eyes.

In the copying machine having the copy guard function, the special dot pattern is detected from image data which is obtained by scanning the document. Then, the copying machine reads a predetermined number of the special dot patterns, and the pattern printed on the document is determined as a copy prevention pattern, and copying of the document is prohibited. However, if another image such as the latent image is printed on the mask pattern, there may be cases where detection of the special dot pattern is interfered so that the time for detection becomes long, and detection of the special dot pattern is failed, so that copying may be preformed mistakenly. The above-described Japanese Patent Unexamined Publication No. 2005-235181 discloses the technology of designating print area of a pattern image including the latent image. However, it is necessary that area designation is performed by the user, so that it was time-consuming.

SUMMARY OF THE INVENTION

The present invention was made to solve the problem described above, and its object is to create a copy prevention pattern which allows a copying machine having the copy guard function to perform reading of the special dot pattern assuredly.

In other words, the present invention relates to an image processing apparatus including: an image area detecting portion which detects an image area, which is on a recording medium and formed with an image, from a document image used for forming an image onto the recording sheet; a pattern creating portion which creates a mask pattern having a special pattern incorporated into an area corresponding to a whole surface of the recording medium, and creates a copy prevention pattern by embedding a latent image, which comes up at a time of copying, only to the detected image area in the area in which the mask pattern is created; and a print image creating portion which creates a print image by superimposing the created copy prevention pattern and the document image to each other.

These and other objects, features and advantages of the present invention will become more apparent upon reading of the following detailed description along with the accompanied drawings.

DETAILED DESCRIPTION OF THE PREFERRED EMBODIMENTS

Figure 1:
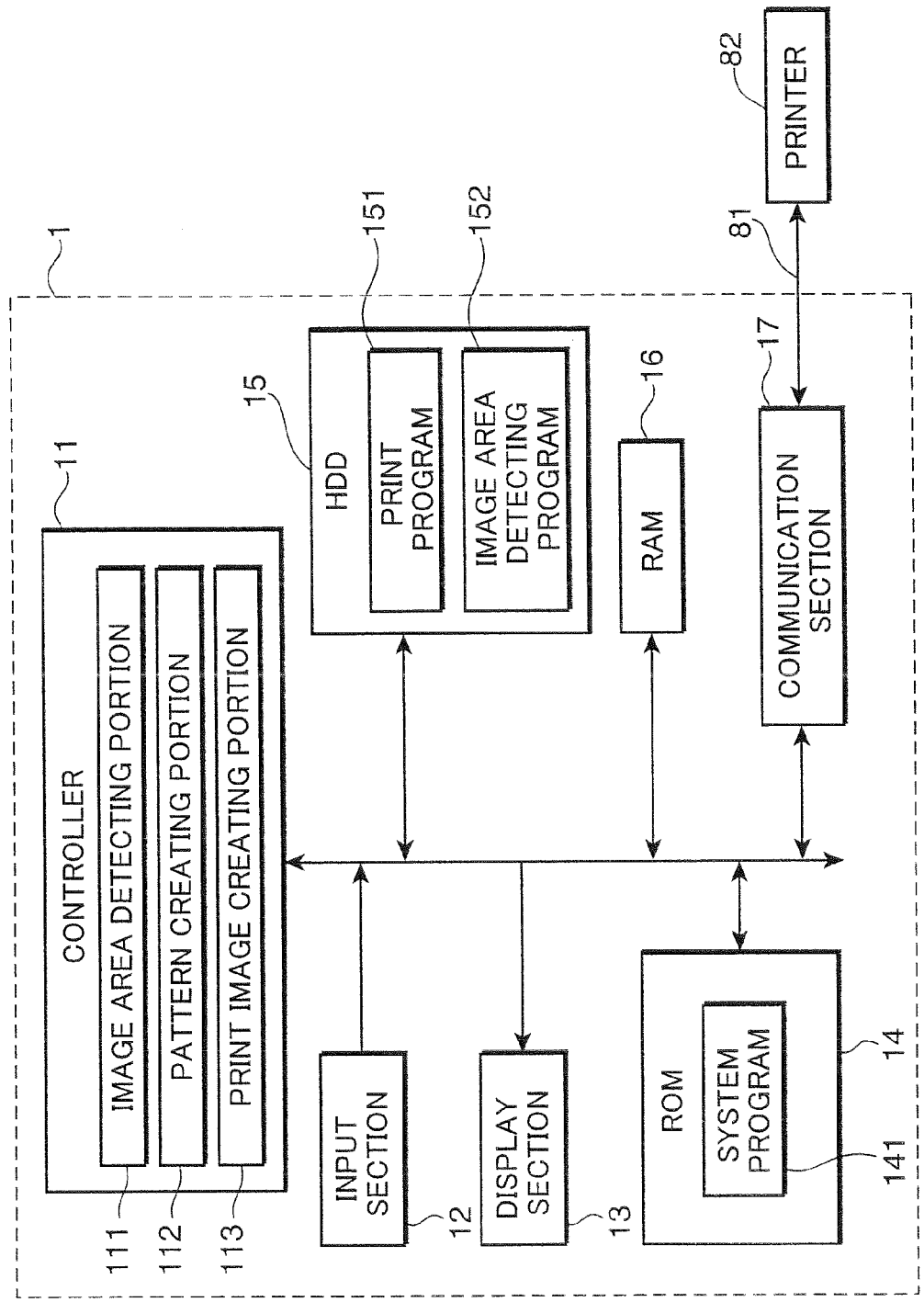
FIG. 1 is a block diagram showing a configuration of an image processing apparatus.

Hereinafter, an image processing apparatus and an image processing program in accordance with an embodiment of the present invention will be described. FIG. 1 is a block diagram showing a configuration of an image processing apparatus 1. The image processing apparatus 1 is realized by a computer (for example, a personal computer, a host computer, and the like) and includes a controller 11, an input section (image area detection necessity receiving portion, latent image selection receiving portion) 12, a display section 13, a ROM (Read Only Memory) 14, an HDD (Hard Disk Drive) 15, a RAM (Random Access Memory) 16, and a communication section 17.

The controller 11 includes a CPU (Central Processing Unit) and other peripheral devices, and executes processing based on a predetermined program in accordance with inputted instruction signal, gives instructions to respective functional parts, and performs data transfer, so as to totally control the image processing apparatus 1. In particular, the controller 11 reads a program stored in the ROM 14 and the HDD 15 in accordance with an operation signal inputted through the input section 12 and executes a processing in accordance with the program. Then, the controller 11 outputs a display control signal for displaying a processing result to the display section 13 so as to allow the display section 13 to display information in accordance with the processing result.

Further, the controller 11 serves as an image area detecting portion 111, a pattern creating portion 112, and a print image creating portion 113.

The image area detecting portion 111 detects an image area, from a document image of a document created with used of a document creating software, taken up by characters and images in a sheet which is subjected to printing.

The pattern creating portion 112 creates a copy prevention pattern by embedding the latent image into the mask pattern.

The print image creating portion 113 superimposes the generated copy prevention pattern and the document image with each other to create a print image.

The input section 12 includes a keyboard having character/alpha-numerals input keys, a cursor key, and various function keys, and a pointing device such as a touch-pad and a mouse, and outputs an operation signal of a key pressed on the keyboard and an operation signal of the pointing device to the controller 11.

Further, the input section 12 receives from a user a selection input regarding whether or not a detection is to be performed by the image area detecting portion 111, and a selection of a latent image used by the pattern creating portion 112 to create a copy prevention pattern.

The display section 13 includes a display screen such as a CRT (Cathode Ray Tube) and an LCD (Liquid Crystal Display), and performs displaying of characters and images in accordance with a display control signal outputted from the controller 11. The ROM 14 stores a system program 141 for realizing a basic operation of the image processing apparatus 1, data, and the like.

The HDD 15 is a large-capacity storage device used as an auxiliary storage device of the image processing apparatus 1, and stores a program for realizing various functions which the image processing apparatus 1 has, data, and the like. In the present embodiment, the HDD 15 stores a printing program 151 and an image area detection program 152.

The printing program 151 is a program which is executed at a time when a document created by a document creating software is printed by a printer. In a copying machine having the copy guard function, the printing program 151 creates a mask pattern, into which a special dot pattern which prohibits copying of a document is incorporated, and a pattern image which allows a latent image such as "copy prohibited" to come up at a time of copying. Then, the printing program 151 creates a print image is created by superimposing those and a document image with each other. Hereinafter, the "mask pattern" will be referred to as a pattern into which a predetermined special dot pattern (an example of "special pattern" in claims). The special pattern in claim may be, other than the special dot pattern, a pattern which includes special characters and images, and may be any pattern as long as it is a special pattern which can be detected by a copying machine having a copy guard function. The image area detection program 152 is adapted to detect, from a document image, an area taken up by characters and images with respect to a sheet to be printed, and is a sub-routine program of the printing program 151.

In a copying machine which is capable of detecting the special dot pattern (copying machine having the copy guard function), copying of a document on which the special dot pattern is formed cannot be performed, so that leaking of information due to copying can be prevented.

Figure 2:
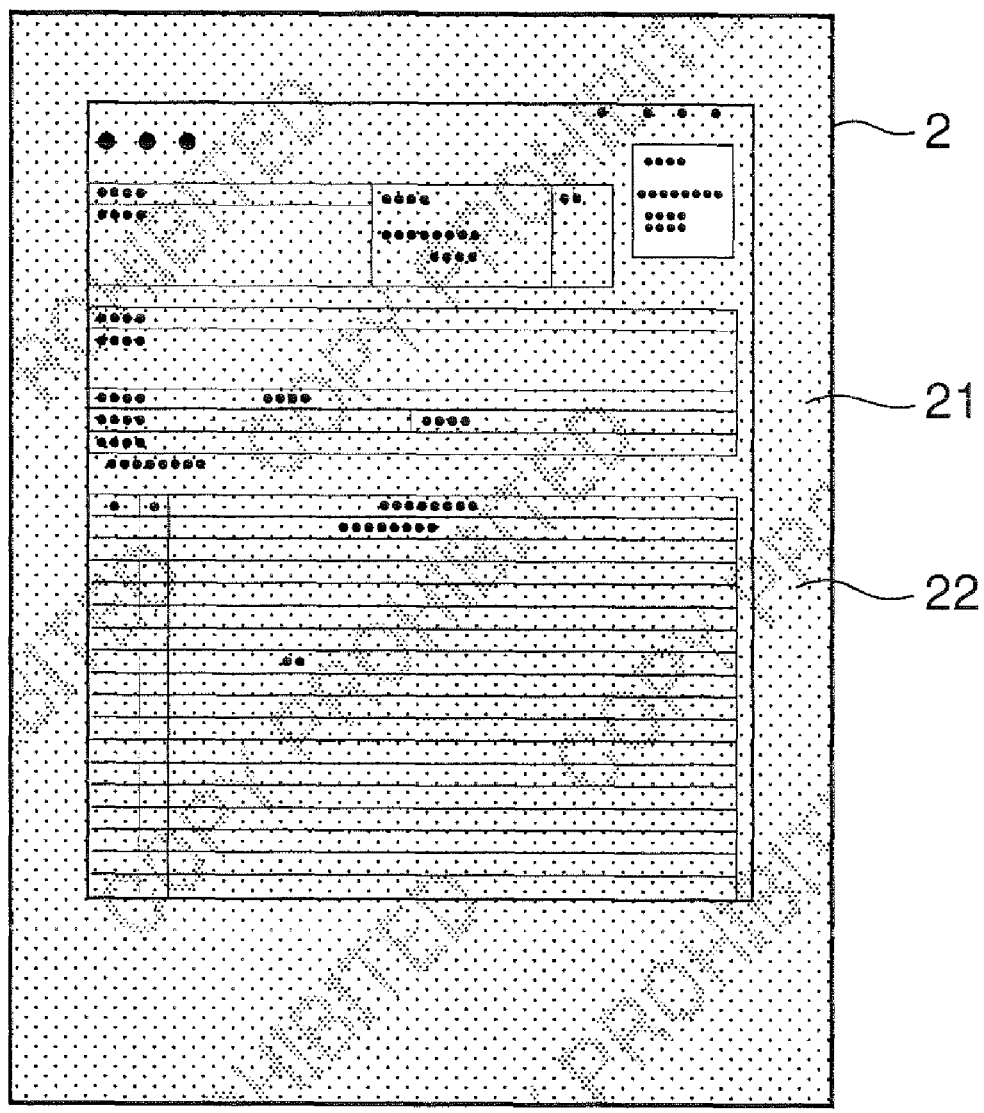
FIG. 2 shows a conventional copy prevention pattern.

FIG. 2 shows a document 2 in which the copy prevention pattern, which has characters of "copy prohibited" embedded as the latent image 22 into the mask pattern 21, is printed on a whole sheet. When the copying machine having the copy guard function performs copying of the document 2, the copying machine sequentially detects dot patterns from an image read from the document 2. In a case where the special dot pattern is not detected, the copying machine copies the document 2 in a normal manner. In a case where the special dot pattern is detected, the copying machine aborts copying document 2, or prints a solid image and does not perform copying.

If the detection of the dot pattern is performed with respect to the whole image read by the copying machine from the document 2, it takes up a long time before determining that the mask pattern is printed. Therefore, for example, the following method is used. The copying machine sequentially detects dot patterns from the read image. When the number of detected special dot patterns reaches a predetermined number, it is determined that the mask pattern is printed. In a case where the special dot pattern is not detected after passing from a reading start position to a predetermined area (for example, even after reading an area greater than one-third of the document), it is determined that the mask pattern is not formed.

However, as shown in FIG. 2, if the latent image 22 is printed near an end of the document 2 corresponding to the reading start position of the copying machine, the mask pattern 21 is not printed in an area where the latent image 22 is printed. Therefore, a time is taken up before a predetermined number of dot patterns is detected. In other words, a time is taken up before it is determined that copying of the document 2 is prohibited. Further, there may be a possibility that the copying machine determines that the mask pattern is not printed on the reason that the number of detected the special dot patterns does not become greater than the predetermined number even after the predetermined area from the reading start position of the document 2, so that the copying of the document 2 is executed.

Figure 3A:
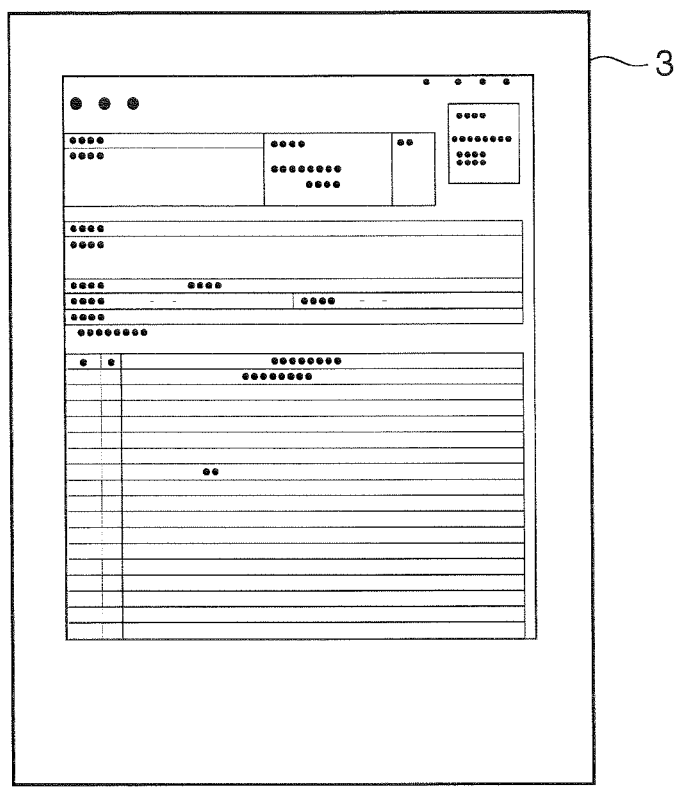
FIG. 3 is a drawing for explanation on a copy prevention pattern in accordance with the present embodiment.
Figure 3B:
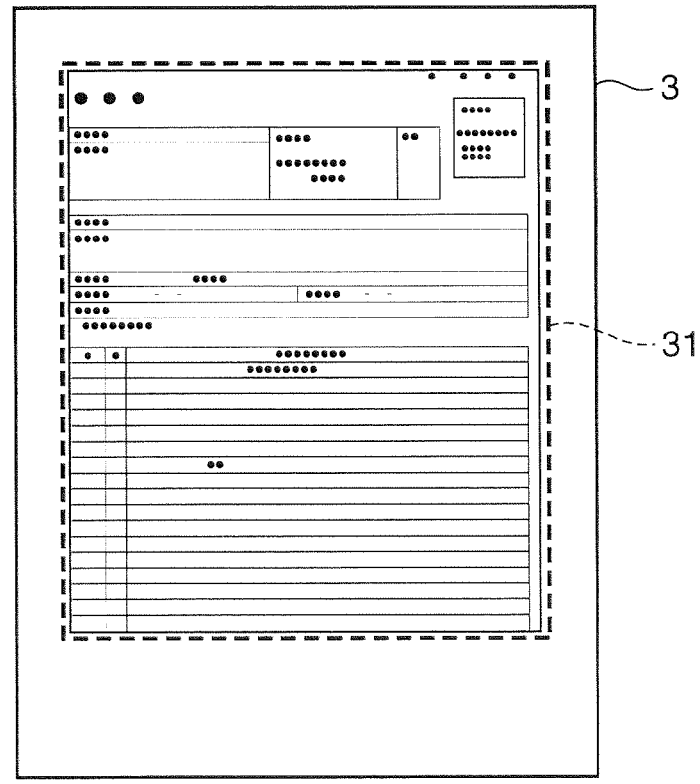
Figure 4:
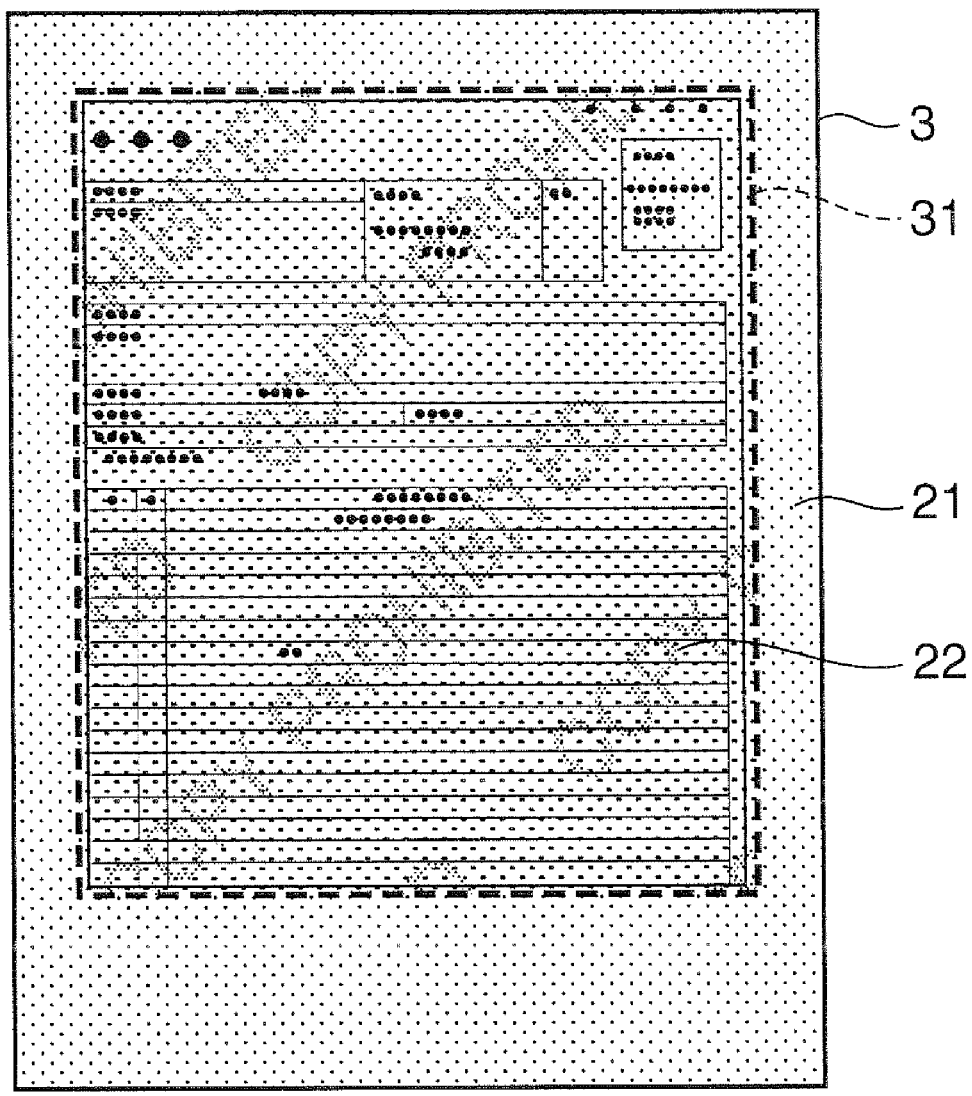
FIG. 4 is a drawing for explanation on a copy prevention pattern in accordance with the present embodiment.
Figure 5:
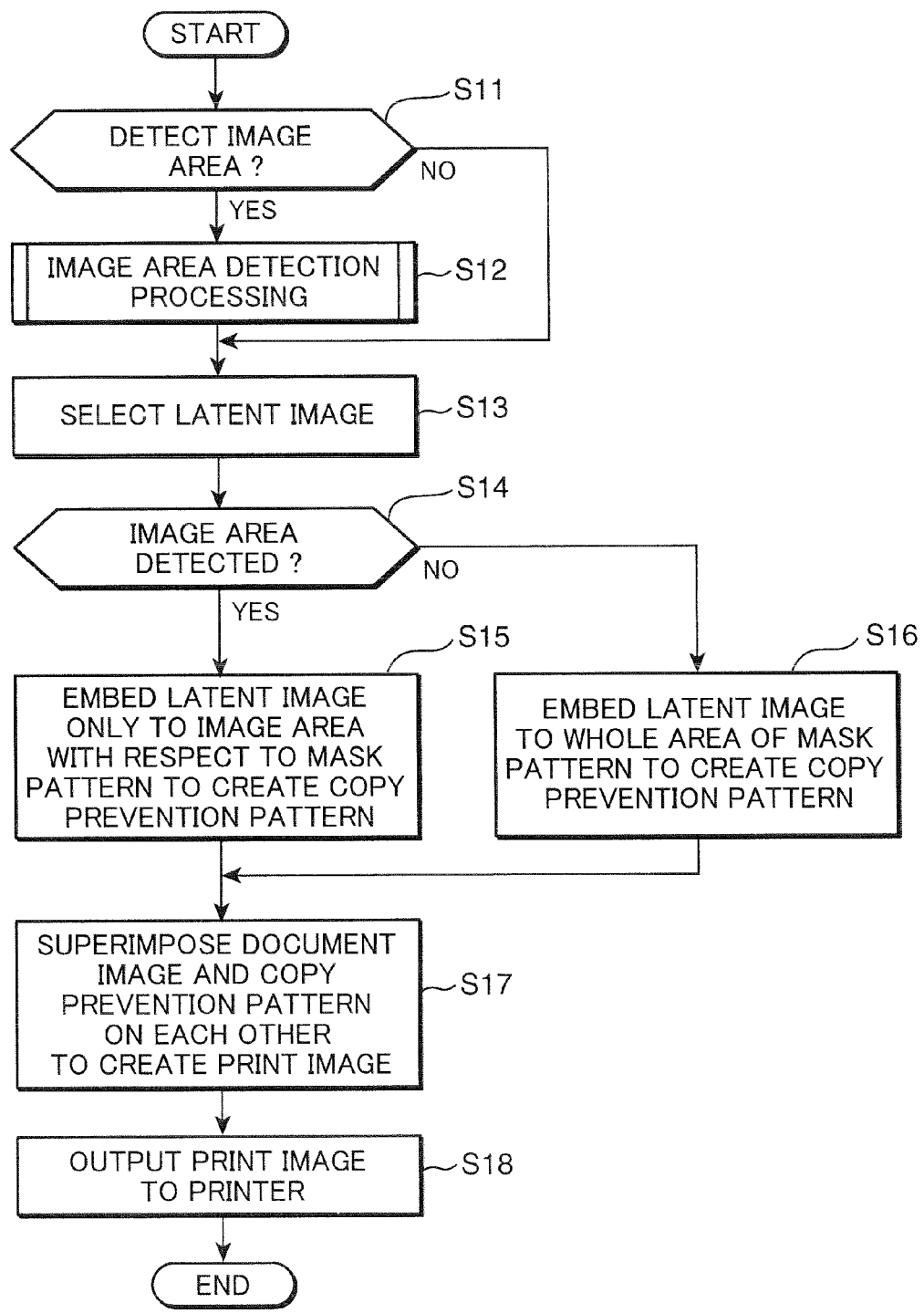
FIG. 5 is a flowchart showing a flow of a printing processing.

For the purpose of preventing such failure in detecting the special dot pattern, according to the present embodiment, the image processing apparatus 1 is proposed. In the image processing apparatus 1, an image area which includes characters and shapes to be actually printed to the sheet subjected to printing is grasped, and the mask pattern is arranged on the whole sheet. However, the latent image is embedded only to the image area so that the copy prevention pattern is created. FIGS. 3-5 will be referred for specific description. FIG. 3A shows that a document created with use of a document creating software and a sheet subjected to printing overlap with each other, and it will be referred to as "document 3". The document 3 is not a printed object but a mere imaginary drawing before printing, and it is appears when being outputted by the printer 82 after execution of the printing program 151 by the controller 11.

The controller 11 executes the printing program 151, so that the image area detection program 152 is executed as a sub-routine program. In accordance with the execution of the image area detection program 152, the image area detecting portion 111 detects an image area where characters and images are formed in the document 3. In other words, the image area detecting portion 111 detects an area of a frame 31 as an image area of the document 3, as shown in FIG. 3B. Then, the pattern creating portion 112, as shown in FIG. 4, creates the copy prevention pattern so that the latent image 22 of "copy prohibited" is arranged only in an area of the frame 31 with respect to the mask pattern 21 arranged in a whole area of the sheet, and the print image creating portion 113 superimposes the created copy prevention pattern and the document image with each other to create a print image. The mask pattern 21 and the latent image 22 before being copied are formed originally at the same density which cannot be distinguished by naked eyes. However, FIG. 4 is depicted in such a manner that position of the latent image 22 can be identified for easiness in description.

In a case where the document creating software and the like is used to create a document, and printing is performed, a blank portion exists on upper, lower, left and right of a sheet, where no characters and shapes are present. Further, since the blank portion (margin area) is generally an area including a reading start position in a copying machine, no latent image is formed in the blank portion, and a copy prevention pattern is created. Accordingly, the copying machine having the copy guard function can assuredly detect the dot pattern included in the mask pattern, so that failure in detecting the special dot pattern can be prevented. Further, since a latent image is printed in the image area, the latent image comes up and is printed if the document is copied by the copying machine which does not have a copy guard function. Accordingly, the effect of psychologically preventing unfair copying as conventional manner can also be achieved.

FIG. 1 will be referred back. The RAM 16 serves as a working memory which develops various program and data read by the controller 11 from the ROM 14 and temporarily retains data such as an instruction inputted through the input section 12, input data, a processing result which occurs in accordance with execution of various programs.

The communication section 17 includes a communication module such as a LAN board, and transmits various data through a network 81 connected to the communication section 17. In particular, the controller 11 reads the printing program 151 stored in the HDD 15 and executes the same to create print image data. The controller 11 outputs the print image data to the communication section 17, and the communication section 17 outputs the same to the printer 82 through the network 81. The printer 82 performs printing in accordance with the transmitted print image data.

Figure 6:
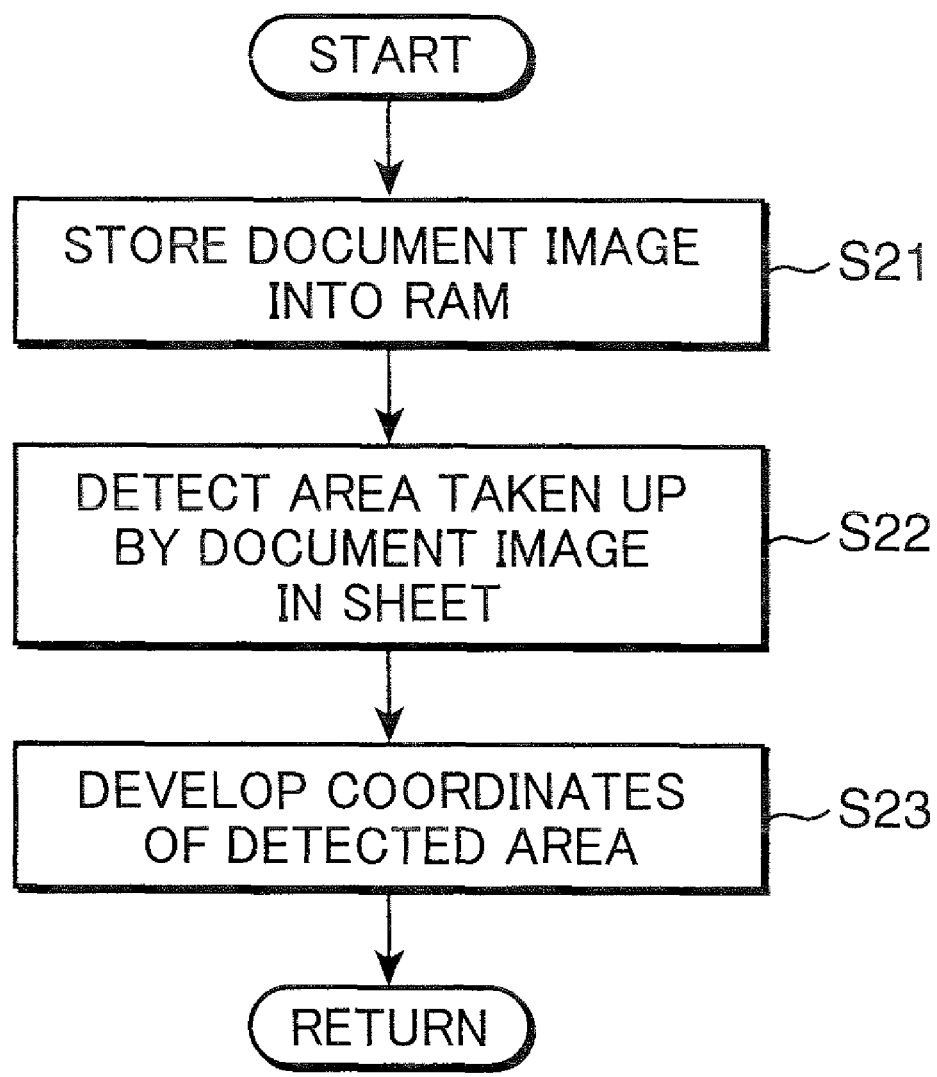
FIG. 6 is a flowchart showing a flow of an image area detection processing.
Figure 7:
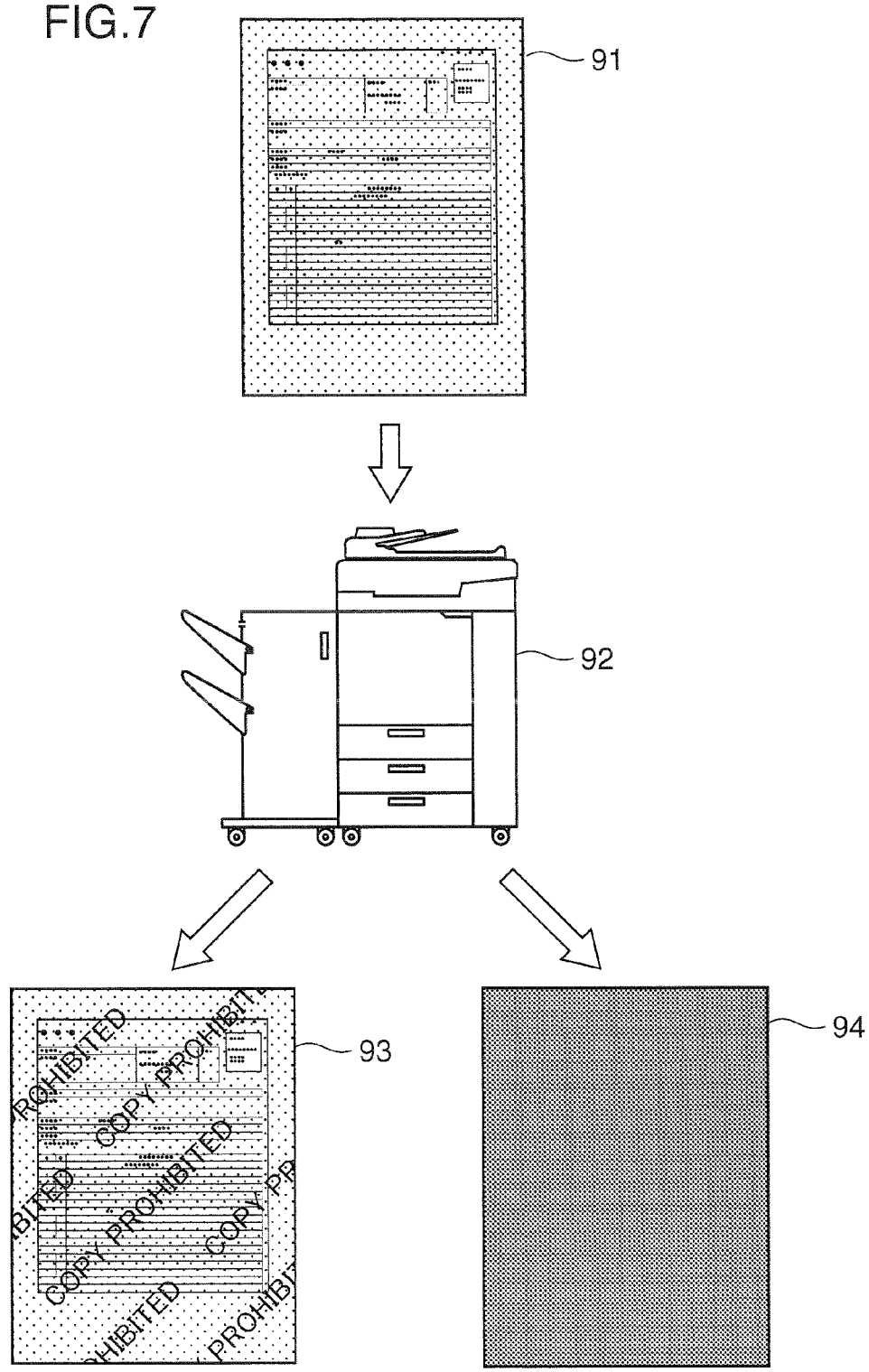
FIG. 7 shows a work flow of the copy guard function.

FIG. 5 is a flowchart showing a flow for the time when the controller 11 executes a processing in accordance with the printing program 151. FIG. 6 is a flowchart showing a flow for the time when the controller 11 executes a processing in accordance with the image area detection program 152. The printing processing in accordance with the present embodiment will be described in detail with reference to FIGS. 5 and 6. When the document creating software receives an instruction from a user, the controller 11 reads the printing program 151 from the HDD 15 and executes a processing and controls the display section 13 to display a screen (unillustrated) for print setting. A user operates the printing input section 12 to perform a selection input related to presence or absence of the copy prevention pattern through the print setting screen. In a case where the copy prevention pattern is to be printed, the user performs a selection input related to various settings such as whether or not detection of image area of the document is to be performed. In a case where the detection of an image area is not performed (step S11; NO), the controller 11 controls the routine to proceed to step S13 without performing the image area detection processing.

In a case where the detection of image area is performed (step S11; YES), the controller 11 reads the image area detection program 152 from the HDD 15 and executes the processing. Firstly, the controller 11 temporarily stores the document image into the RAM 16 (step S21), and the image area detecting portion 111 detects from the document image an image area in the sheet subjected to printing (step S22). (1) The image area detecting portion 111, for example, may analyze a document image, and detect an area where characters or images are present as the image area among the document image. (2) Or, the image area detecting portion 111 may find out the image area in accordance with the predetermined blank portion regardless of characters or images. In other words, the image area detecting portion 111 detects the area other than the margin as the image area without analyzing the document image. For example, an area other than the blank portion on upper, lower, left, and right sides of a page may be extracted as image areas. The image area detecting portion 111 converts the detected image area into, for example, coordinate values on the sheet (step S23), and the controller 11 allows the processing to proceed to step S13 of the printing processing.

Next, the controller 11 receives selection of a latent image from a user (step S13). The selection of the latent image is received from a user through the input section 12 via the print setting screen, so that text characters and preferred images are selected. Then, in a case where the image area is detected (step S14; YES), the pattern creating portion 112 embeds the selected latent image into the mask pattern within the area of the coordinate values to create a copy prevention pattern (step S15). On the other hand, in a case where the image area detection is not performed (step S14; NO), the pattern creating portion 112 embeds the selected latent image into the whole mask pattern to create the copy prevention pattern (step S16).

Next, the print image creating portion 113 superimposes the created copy prevention pattern and the document image with each other to create a print image (step S17), and the controller 11 outputs the print image to the printer 82 through the communication section 17 (step S18). Then, the processing is terminated.

As described above, when copying with the copying machine having a copy guard function a document which is printed by detecting an image area of a document, not arranging the latent image outside the image area, and arranging the latent image within the image area, creating the copy prevention pattern and superimposing the same with the document image, only the mask pattern without the latent image is formed in the area corresponding to the reading start position. Accordingly, the copying machine can assuredly detect the special dot pattern included in the mask pattern without being interfered by the latent image, so that failure in detecting the dot pattern can be prevented. Further, the time for detecting the special dot pattern can be shortened. Further, since the latent image is printed in the image area, if the document is copied with a copying machine which does not have the copy guard function, the latent image comes up and is printed. Thus, the effect of preventing unfair copying as conventional can be achieved.

The present invention is not limited to the configuration of the embodiment, and it may be modified in various manners. In the present embodiment, a computer such as a personal computer having the functions of the image forming apparatus in accordance with the present invention is described as an example. However, it can be realized with a copying machine. The copying machine having the functions of the image processing apparatus in accordance with the present invention reads a document with a scanner, detects an image area from the read image data, and creates the copy prevention pattern in which the latent image is embedded only in the detected area. Then, the document image and the copy prevention pattern are superimposed with each other so that a print image is created. Then, the print image is printed onto the sheet, and the sheet is discharged as a copy. Accordingly, the copy prevention pattern can be printed easily with respect to a document.

Further, in the present embodiment, the mask pattern is described as a pattern into which a special dot pattern (special pattern) is incorporated. However, it may be a mask pattern into which code characters are embedded. Any pattern may be adopted as long as copying is prohibited when the mask pattern is identified at the time of copying in the copying machine having a copy guard function.

In summary, the present invention relates to an image processing apparatus including: an image area detecting portion which detects an image area, which is on a recording medium and formed with an image, from a document image used for forming an image onto the recording sheet; a pattern creating portion which creates a mask pattern having a special pattern incorporated into an area corresponding to a whole surface of the recording medium, and creates a copy prevention pattern by embedding a latent image, which comes up at a time of copying, only to the detected image area in the area in which the mask pattern is created; and a print image creating portion which creates a print image by superimposing the created copy prevention pattern and the document image to each other.

Further, the present invention relates to a computer-readable recording medium storing an image processing program which allows a computer to serve as: an image area detecting portion which detects an image area, which is on a recording medium and formed with an image, from a document image used for forming an image onto the recording sheet; a pattern creating portion which creates a mask pattern having a special pattern incorporated into an area corresponding to a whole surface of the recording medium, and creates a copy prevention pattern by embedding a latent image, which comes up at a time of copying, only to the detected image area in the area in which the mask pattern is created; and a print image creating portion which creates a print image by superimposing the created copy prevention pattern and the document image to each other.

For example, when the copying machine having the function reads a document, if an image other than the mask pattern is formed in an area (generally an area near an edge of a document) corresponding to a reading start position, there is a possibility that detection of the special pattern takes much time, or detection of the special pattern fails so that copying is performed mistakenly. According to the invention, a mask pattern is created on a whole surface of a recording medium, and by arranging the latent image only in an image area, only a mask pattern is formed in an area corresponding to a reading start position of the copying machine. Therefore, according to the invention, when the copying machine reads a document to which the image processing is applied, the copying machine can perform the pattern detection without being interfered by an image such as a latent image which does not relate to a special pattern, so that it contributes to shortening in detection time of the special pattern and prevention of failure in detection.

Other than this, according to the invention, a copy prevention pattern into which a latent image is embedded only in an image area without works such as area detection by a user. Accordingly, user's work is reduced, so that printing can be preformed smoothly.

Further, according to the present invention, the image processing apparatus further includes: an image area detection necessity receiving portion which receives from a user a selection input of whether or not the detection is to be performed by the image area detecting portion, and when the image area detection necessity receiving portion receives a selection input of performing the detection, the pattern creating portion creates the copy prevention pattern by embedding the latent image into the detected image area in the mask pattern creating area, and when the image area detection necessity receiving portion receives a selection input of not performing the detection, the pattern creating portion creates the copy prevention pattern by embedding the latent image into a whole area of the mask pattern.

Further, according to the present invention includes the computer-readable recording medium storing the image processing program allows the computer to further serve as: an image area detection necessity receiving portion which receives from a user a selection input of whether or not the detection is to be performed by the image area detecting portion, and when the image area detection necessity receiving portion receives a selection input of performing the detection, the pattern creating portion creates the copy prevention pattern by embedding the latent image into the detected image area in the mask pattern creating area, and when the image area detection necessity receiving portion receives a selection input of not performing the detection, the pattern creating portion creates the copy prevention pattern by embedding the latent image into a whole area of the mask pattern.

According to the invention, selection if the latent image is embedded to the mask pattern only in an image area or a whole surface of an image area can be made, so that convenience as an image processing apparatus can be improved.

Further, according to the present invention, the image area detecting portion analyzes the document image and detects an area, in which a character or an image is present, as the image area from the document image.

Further, according to the present invention, the computer-readable recording medium storing the image processing program, and the image processing program allows the computer to serve so that the image area detecting portion analyzes the document image and detects an area, in which a character or an image is present, as the image area from the document image.

According to the invention, among the document image, embedding of the latent image by the pattern creating portion is not performed with respect to the area where the image actually indicating characters or images are not present, but only the special pattern is incorporated.

Further, according to the present invention, the image area detecting portion detects an area other than a predetermined blank portion as the image area from the document image, and the pattern creating portion creates no copy prevention pattern in the predetermined blank portion.

Further, according to the present invention, the computer-readable recording medium stores the image processing program, and the image processing program allows the computer to serve so that the image area detecting portion detects an area other than a predetermined blank portion as the image area from the document image, and the pattern creating portion creates no copy prevention pattern in the predetermined blank portion.

According to the invention, at the time of executing the image detection processing, the image area detecting portion can specify an area, in which the pattern creating portion incorporates only the special pattern without embedding the latent image, without executing the complex processing to extract an area where the image indicting characters or images from the document image are present. Accordingly, the image detection processing can be simplified.

Further, according to the present invention, the image processing apparatus further includes: a latent image selection receiving portion which receives from a user a selection of the latent image which is used by the pattern creating portion to create the copy prevention pattern, and the pattern creating portion creates the copy prevention pattern by using the latent image selected at the latent image selection receiving portion.

Further, according to the present invention, the computer-readable recording medium stores the image processing program which allows the computer to further serve as: a latent image selection receiving portion which receives from a user a selection of the latent image which is used by the pattern creating portion to create the copy prevention pattern, and the pattern creating portion creates the copy prevention pattern by using the latent image selected at the latent image selection receiving portion.

According to the invention, a user can embed a desired latent image only to the image area.

Further, the present invention includes an image forming apparatus including the image processing apparatus in accordance with the present invention; and an image forming section which forms the print image onto a recording medium.

This application is based on Japanese Patent application serial No. 2007-282791 filed in Japan Patent Office on Oct. 31, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing apparatus, comprising:
    an image area detecting portion which detects an image area, which is on a recording medium and formed with an image, from a document image used for forming an image onto the recording sheet;
    a pattern creating portion which creates a mask pattern having a special pattern incorporated into an area corresponding to a whole surface of the recording medium, and creates a copy prevention pattern by embedding a latent image, which comes up at a time of copying, only to the detected image area in the area in which the mask pattern is created;
    a print image creating portion which creates a print image by superimposing the created copy prevention pattern and the document image to each other; and
    an image area detection necessity receiving portion which receives from a user a selection input of whether or not the detection is to be performed by the image area detecting portion, wherein
    when the image area detection necessity receiving portion receives a selection input of performing the detection, the pattern creating portion creates the copy prevention pattern by embedding the latent image into the detected image area in the mask pattern creating area, and when the image area detection necessity receiving portion receives a selection input of not performing the detection, the pattern creating portion creates the copy prevention pattern by embedding the latent image into a whole area of the mask pattern.

2. The image processing apparatus according to claim 1, wherein the image area detecting portion analyzes the document image and detects an area, in which a character or an image is present, as the image area from the document image.

3. The image processing apparatus according to claim 1, wherein the image area detecting portion detects an area other than a predetermined blank portion as the image area from the document image, and the pattern creating portion creates no copy prevention pattern in the predetermined blank portion.

4. The image processing apparatus according to claim 1, further comprising:
    a latent image selection receiving portion which receives from a user a selection of the latent image which is used by the pattern creating portion to create the copy prevention pattern, wherein
    the pattern creating portion creates the copy prevention pattern by using the latent image selected at the latent image selection receiving portion.

5. An image forming apparatus, comprising:
    the image processing apparatus according to claim 1; and
    an image forming section which forms the print image onto a recording medium.

6. A non-transitory computer-readable recording medium storing an image processing program which allows a computer to serve as:
    an image area detecting portion which detects an image area, which is on a recording medium and formed with an image, from a document image used for forming an image onto the recording sheet;
    a pattern creating portion which creates a mask pattern having a special pattern incorporated into an area corresponding to a whole surface of the recording medium, and creates a copy prevention pattern by embedding a latent image, which comes up at a time of copying, only to the detected image area in the area in which the mask pattern is created;
    a print image creating portion which creates a print image by superimposing the created copy prevention pattern and the document image to each other; and
    an image area detection necessity receiving portion which receives from a user a selection input of whether or not the detection is to be performed by the image area detecting portion, and
    when the image area detection necessity receiving portion receives a selection input of performing the detection, the pattern creating portion creates the copy prevention pattern by embedding the latent image into the detected image area in the mask pattern creating area, and when the image area detection necessity receiving portion receives a selection input of not performing the detection, the pattern creating portion creates the copy prevention pattern by embedding the latent image into a whole area of the mask pattern.

7. The computer-readable recording medium storing the image processing program according to claim 6, wherein the image processing program allows the computer to serve so that the image area detecting portion analyzes the document image and detects an area, in which a character or an image is present, as the image area from the document image.

8. The computer-readable recording medium storing the image processing program according to claim 6, wherein the image processing program allows the computer to serve so that the image area detecting portion detects an area other than a predetermined blank portion as the image area from the document image, and the pattern creating portion creates no copy prevention pattern in the predetermined blank portion.

9. The computer-readable recording medium storing the image processing program according to claim 6, wherein the image processing program allows the computer to further serve as:
  a latent image selection receiving portion which receives from a user a selection of the latent image which is used by the pattern creating portion to create the copy prevention pattern, wherein
  the pattern creating portion creates the copy prevention pattern by using the latent image selected at the latent image selection receiving portion.

\* \* \* \* \*